(12) United States Patent
Chu et al.

(10) Patent No.: US 6,776,577 B1
(45) Date of Patent: Aug. 17, 2004

(54) METHOD AND APPARATUS TO FACILITATE REDUCING STEAM LEAKAGE

(75) Inventors: Kafu Chu, Niskayuna, NY (US); James Patrick Nelligan, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 13 days.

(21) Appl. No.: 10/359,900

(22) Filed: Feb. 6, 2003

(51) Int. Cl.[7] .............................................. F01D 11/02
(52) U.S. Cl. ..................... 415/214.1; 415/173.7; 415/174.2; 415/174.5; 415/103; 29/889.2; 277/628; 277/630; 277/632
(58) Field of Search ................. 415/174.2, 174.5, 415/173.7, 170.1, 214.1, 229, 230, 231, 100–103; 277/628, 630, 632; 29/525.02, 525.03, 889.2

(56) References Cited

U.S. PATENT DOCUMENTS

| 1,999,739 | A | * | 4/1935 | Rasmussen et al. ..... 415/173.7 |
|---|---|---|---|---|
| 3,189,320 | A | * | 6/1965 | Beldecos et al. ........ 415/173.7 |
| 3,867,060 | A | * | 2/1975 | Huber ..................... 415/173.5 |
| 3,942,804 | A | | 3/1976 | Andress et al. |
| 5,076,591 | A | | 12/1991 | Gentile |
| 5,253,875 | A | | 10/1993 | Gentile |
| 5,355,909 | A | | 10/1994 | Smith, III |
| 5,411,365 | A | | 5/1995 | Mazzola et al. |
| 5,501,573 | A | * | 3/1996 | Sanders ................... 415/173.5 |
| 6,286,840 | B1 | | 9/2001 | Zettel |
| 6,349,467 | B1 | | 2/2002 | Karafillis et al. |

* cited by examiner

Primary Examiner—Christopher Verdier
(74) Attorney, Agent, or Firm—Armstrong Teasdale LLP

(57) ABSTRACT

A method of assembling a steam turbine includes positioning a sealing member in a leakage path defined between a first stage nozzle diaphragm and a packing casing, wherein the first stage nozzle diaphragm has a first coefficient of thermal expansion, and the packing casing has a second coefficient of thermal expansion, and coupling the first stage nozzle diaphragm and the packing casing such that the sealing member is fixedly secured between the first stage nozzle diaphragm and the packing casing.

20 Claims, 3 Drawing Sheets

METHOD AND APPARATUS TO FACILITATE REDUCING STEAM LEAKAGE

BACKGROUND OF THE INVENTION

This invention relates generally to steam turbines, and more particularly, to controlling steam leakage paths in the turbine.

A steam turbine has a defined steam path which includes, in serial-flow relationship, a steam inlet, a turbine, and a steam outlet. Steam leakage, either out of the steam path, or into the steam path, from an area of higher pressure to an area of lower pressure may adversely affect an operating efficiency of the turbine. For example, steam-path leakage in the turbine between a rotating rotor shaft of the turbine and a circumferentially surrounding turbine casing, may lower the efficiency of the turbine and cause increased fuel costs. Additionally, steam-path leakage between a shell and the portion of the casing extending between adjacent turbines may reduce the operating efficiency of the steam turbine and over time, may lead to increased fuel costs.

To facilitate minimizing steam-path leakage between a High Pressure (HP) turbine section and a longitudinally-outward bearing, and/or between an Intermediate Pressure (IP) turbine section and a longitudinally-outward bearing, at least some known steam turbines use a packing casing that includes a plurality of labyrinth seals. At least some known labyrinth seals include longitudinally spaced-apart rows of labyrinth seal teeth which are used to seal against pressure differentials that may be present in the steam turbine. Brush seals may also be used to minimize leakage through a gap defined between two components. Although brush seals provide a more efficient seal than labyrinth seals, at least some known steam turbines, which rely on a brush seal assembly between turbine sections and/or between a turbine section and a bearing, also use at least one labyrinth seal as a redundant backup seal for the brush seal assembly. As a result, manufacturing and maintenance costs may be increased.

Other areas of steam path leakage within a turbine may also adversely affect turbine efficiency. For example, relatively large pressure drops across both the packing casing and a nozzle diaphragm may result in a plastic distortion and may result in a reduced steam turbine clearance.

BRIEF DESCRIPTION OF THE INVENTION

In one aspect, a method of assembling a steam turbine is provided. The method includes positioning a sealing member in a leakage path defined between a first stage nozzle diaphragm and a packing casing, wherein the first stage nozzle diaphragm has a first coefficient of thermal expansion, and the packing casing has a second coefficient of thermal expansion, and coupling the first stage nozzle diaphragm and the packing casing such that the first sealing member is fixedly secured between the first stage nozzle diaphragm and the packing casing.

In another aspect, a seal assembly for sealing a leakage path is provided. The seal assembly includes a sealing member, and at least one coupling device extending through the sealing member such that the sealing member is fixedly secured between a first stage steam turbine nozzle diaphragm and a steam turbine packing casing.

In a further aspect, a rotary machine is provided. The rotary machine includes a first stage steam turbine nozzle, a steam turbine packing casing, a seal, and a plurality of bolts extending through the sealing member such that the sealing member is fixedly secured between the first stage steam turbine nozzle diaphragm and the steam turbine packing casing.

DETAILED DESCRIPTION OF THE INVENTION

Figure 1:
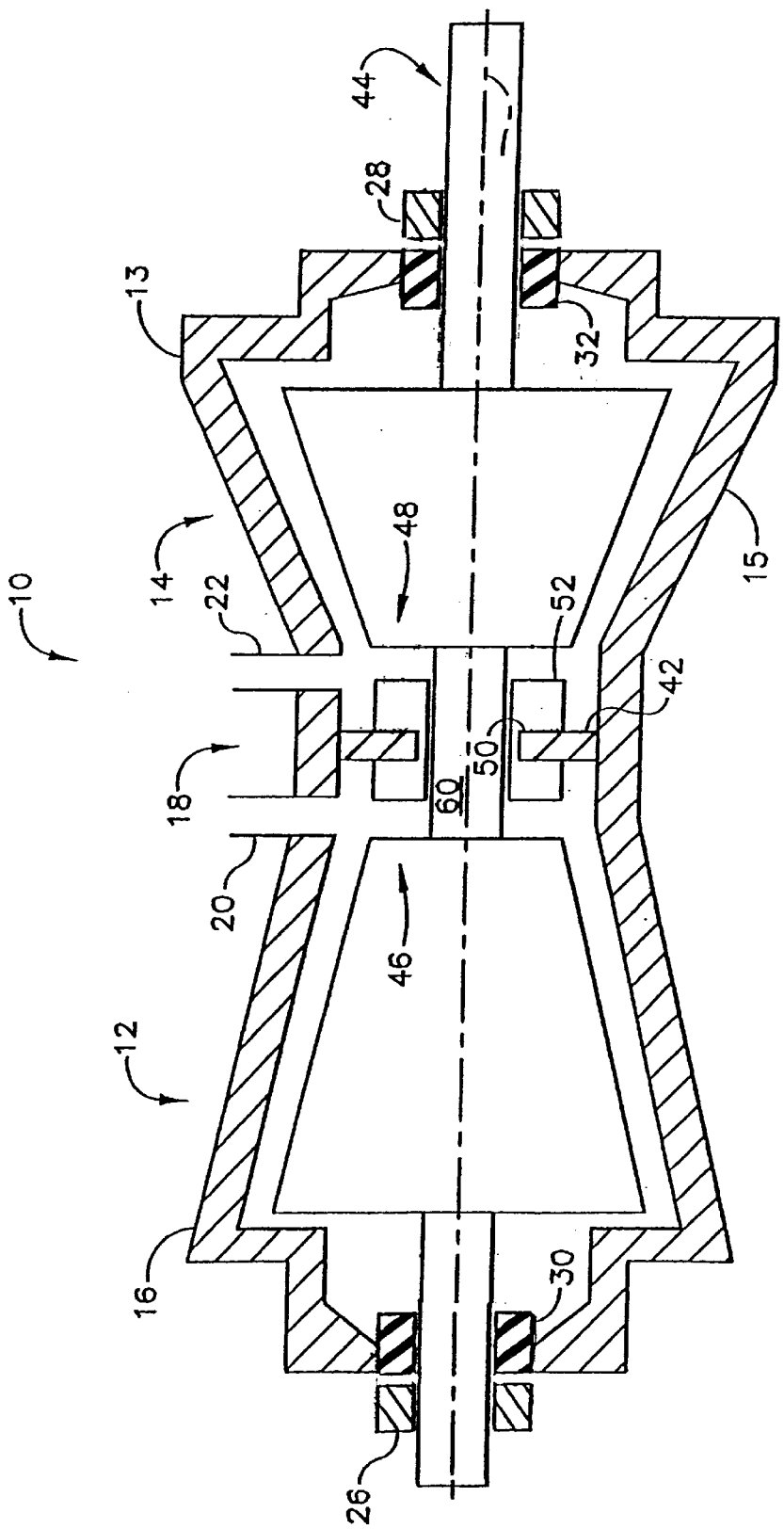
FIG. 1 is a schematic illustration of an exemplary opposed flow High Pressure (HP)/Intermediate Pressure (IP) steam turbine.

FIG. 1 is a schematic illustration of an exemplary opposed-flow steam turbine 10 including a high pressure (HP) section 12 and an intermediate pressure (IP) section 14. An outer shell or casing 16 is divided axially into upper and lower half sections 13 and 15, respectively, and spans both HP section 12 and IP section 14. A central section 18 of shell 16 includes a high pressure steam inlet 20 and an intermediate pressure steam inlet 22. Within casing 16, HP section 12 and IP section 14 are arranged in a single bearing span supported by journal bearings 26 and 28. A steam seal unit 30 and 32 is located in board of each journal bearing 26 and 28, respectively.

An annular section divider 42 extends radially inwardly from central section 18 towards a rotor shaft 44 that extends between HP section 12 and IP section 14. More specifically, divider 42 extends circumferentially around a portion of shaft 44 between a first HP section nozzle 46 and a first IP section nozzle 48. Divider 42 is received in a channel 50 defined in packing casing 52. More specifically, channel 50 is a C-shaped channel that extends radially into packing casing 52 and around an outer circumference of packing casing 52, such that a center opening of channel 50 faces radially outwardly.

During operation, high pressure steam inlet 20 receives high pressure/high temperature steam from a steam source, for example, a power boiler (not shown). Steam is routed through HP section 12 wherein work is extracted from the steam to rotate rotor shaft 44. The steam exits HP section 12 and is returned to the boiler wherein it is reheated. Reheated steam is then routed to intermediate pressure steam inlet 22 and returned to IP section 14 at a reduced pressure than steam entering HP section 12, but at a temperature that is approximately equal to the temperature of steam entering HP section 12. Accordingly, an operating pressure within HP section 12 is higher than an operating pressure within IP section 14, such that steam within HP section 12 tends to flow towards IP section 14 through leakage paths that may develop between HP section 12 and IP section 14.

One such leakage path may be defined extending through packing casing 52 within rotor 44. Accordingly, packing casing 52 includes a plurality of labyrinth and/or brush seals to facilitate reducing leakage from HP section 12 to IP section 14 along a shaft 60. Such labyrinth seals include longitudinally spaced-apart rows of labyrinth seal teeth which are used to facilitate sealing against operating pressure differentials that may be in a steam turbine. Brush seals may also be used to facilitate minimizing leakage through a gap defined between two components, such as leakage that is flowing from a higher pressure area to a lower pressure area. Brush seals provide a more efficient seal than labyrinth seals, however, at least some known steam turbines, which rely on a brush seal assembly between turbine sections and/or between a turbine section and a bearing, also use at least one standard labyrinth seal as a redundant backup seal for the brush seal assembly.

Figure 2:
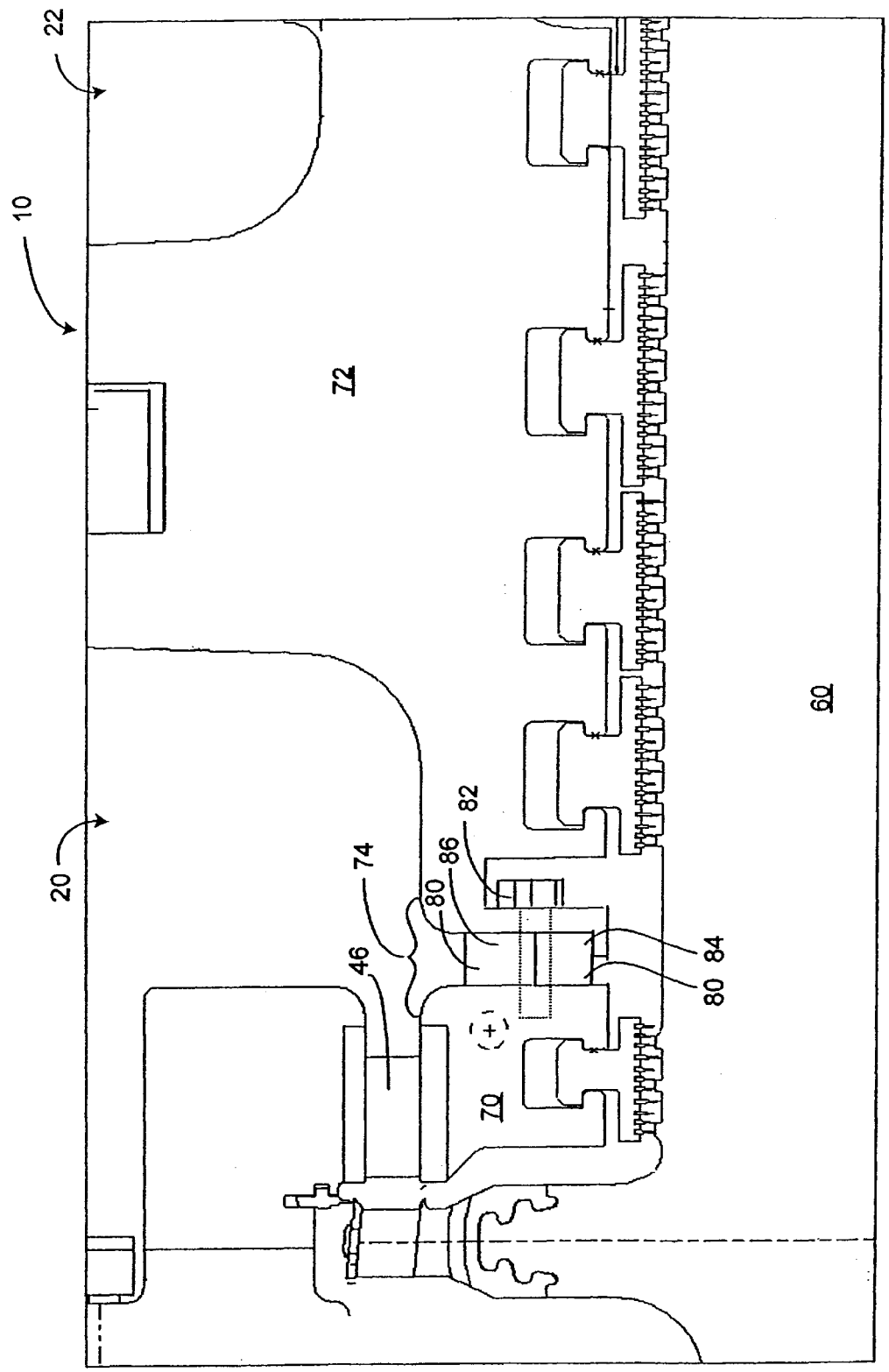
FIG. 2 is an enlarged schematic illustration of a turbine nozzle diaphragm and a packing casing that may be used with the steam turbine shown in FIG. 1.

FIG. 2 is an enlarged schematic illustration of a first high Pressure (HP) section nozzle diaphragm 70, a packing casing 72, also referred to herein as an N2 packing casing, and a seal assembly 74, that may be used in a steam turbine, such as steam turbine 10 (shown in FIG. 1). In the exemplary embodiment, first HP section nozzle diaphragm 70 is fabricated from a base material that has a first coefficient of thermal expansion, and packing casing 72 is fabricated from a base material that has a second coefficient of thermal expansion.

Seal assembly 74 includes a sealing member 80 and a mechanical coupling device 82. In the exemplary embodiment, sealing member 80 is fabricated from a base material that has a third coefficient of thermal expansion. In one embodiment, the third coefficient of thermal expansion is greater than at least one of the first coefficient of thermal expansion and the second coefficient of thermal expansion. In another embodiment, sealing member 80 has a third coefficient of thermal expansion that is different than at least one of the first coefficient of thermal expansion and the second coefficient of thermal expansion. In the exemplary embodiment, sealing member 80 is fabricated from a material, such as, but not limited to an austenitic stainless steel. In one embodiment, mechanical coupling device 82 includes at least one of a bolt, a screw, a stud, and a rivet and is fabricated from a material, such as, but not limited to B5F5B and Cr-Mo-V.

In one embodiment, sealing member 80 includes a first substantially semi-circular portion 84, and a second substantially semi-circular portion 86 positioned such that first portion 84 and second portion 86 substantially circumscribe shaft 60. In another embodiment, sealing member 80 includes a plurality of arcuate segments positioned such that the segments substantially circumscribe shaft 60. In another embodiment, sealing member 80 is formed unitarily.

Figure 3:
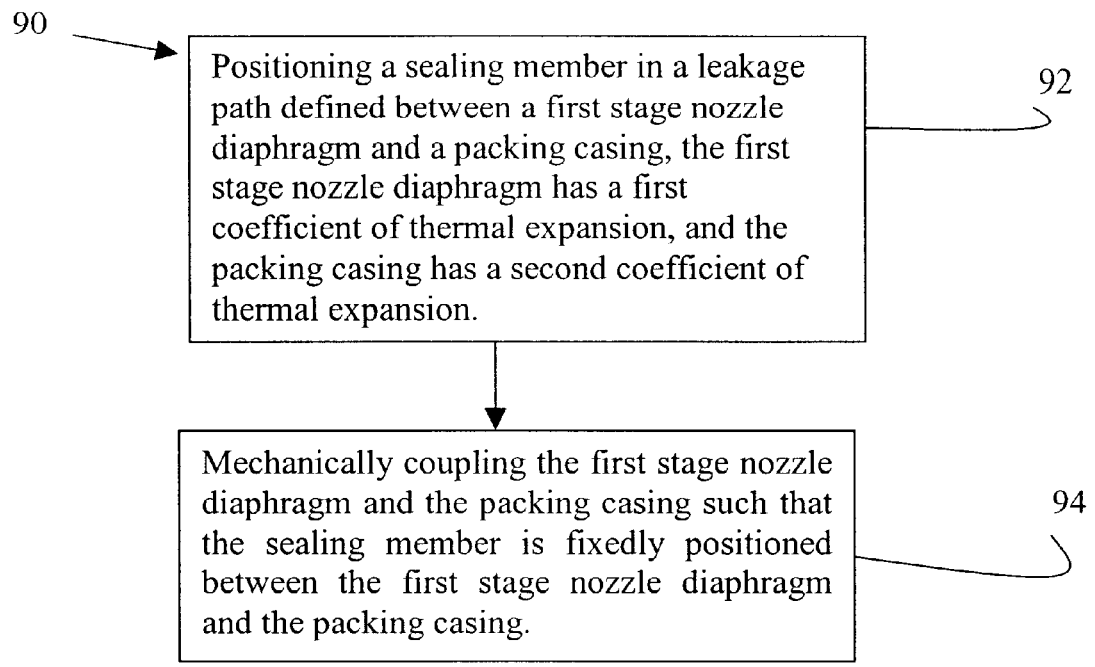
FIG. 3 is a flow chart illustrating an exemplary method for assembling a steam turbine.

FIG. 3 is a flowchart illustrating an exemplary method 90 for assembling a steam turbine 10 that includes positioning 92 a sealing member 80 in a leakage path defined between a first stage nozzle diaphragm 70 and a packing casing 72, wherein first stage nozzle diaphragm 70 has a first coefficient of thermal expansion, and packing casing 72 has a second coefficient of thermal expansion. Method 90 also includes mechanically coupling 94 first stage nozzle diaphragm 70 and packing casing 72 such that sealing member 80 is fixedly secured between first stage nozzle diaphragm 70 and packing casing 72.

In the exemplary embodiment, first stage nozzle diaphragm 70 includes a plurality of threaded openings, and packing casing 72 includes a plurality of openings. During assembly, sealing member 80 is positioned between first stage nozzle diaphragm 70 and packing casing 72. At least one mechanical coupling device 82 is then inserted through packing casing 72 and sealing member 80, and into first stage nozzle diaphragm 70 such that sealing member 80 is fixedly secured between first stage nozzle diaphragm 70 and packing casing 72. Although, the exemplary embodiment describes mechanically coupling first stage nozzle diaphragm 70 and packing casing 72 using a threaded fastener, it is anticipated that a plurality of different mechanical devices can be used to couple first stage nozzle diaphragm 70 and packing casing 72. Additionally, in the exemplary embodiment, a plurality of mechanical coupling devices 82 are used to couple first stage nozzle diaphragm 70 and packing casing 72 such that seal member 80 is maintained in a substantially fixed position with respect to first stage nozzle diaphragm 70 and packing casing 72.

In operation, steam at higher pressure in HP section 12 tends to leak through a steam path defined between first stage nozzle diaphragm 70 and packing casing 72 to IP section 14, which is at a lower operating pressure. For example, high pressure steam is admitted to HP section 12 at approximately 1800 pounds per square inch absolute (psia), and reheat steam is admitted to IP section 14 at between approximately 300–400 psia. Accordingly, a relatively large pressure drop across packing casing 72 may cause steam to leak around packing casing 72, resulting in a reduction in steam turbine efficiency. Additionally, a relatively large force across packing casing 72 may cause relatively large amounts of deflections, both elastic and creep of packing casing 72. Because sealing member 80 is positioned between first stage nozzle diaphragm 70 and packing casing 72, sealing member 80 facilitates separating the inlet flows of the high pressure inlet steam and a reheater inlet steam. Additionally, seal member 80 facilitates providing a substantially tight seal between first stage nozzle diaphragm 70 and packing casing 72 by mechanically coupling seal member 80 between first stage nozzle diaphragm 70 and packing casing 72, facilitates stiffening packing casing 72, and facilitates reducing a pressure drop near a bore of packing casing 72, which thereby reduces the net force that may cause N2 deflection to occur.

The seal assembly described herein facilitates reducing/eliminating steam leakage between the first stage steam turbine nozzles and the packing casing, and also facilitates increasing a stiffness of both the packing casing and the nozzle diaphragm since the material used to fabricate the seal has a coefficient of thermal expansion greater that that of the nozzle diaphragm and/or the packing casing base material, thereby providing a tight steam seal between the two components. Increased stiffness also facilitates a reduction in an axial space, thereby resulting in a potential reduction in an initial cost of a steam turbine, required to design the turbine, thus potentially reducing steam turbine initial cost while improving long term stability in clearances. Additionally, the seal assembly described herein facilitates a reduction in both a pressure drop experienced by the packing head and the moment arm of the load center, thereby facilitating a reduction in a distortion driver.

Exemplary embodiments of seal arrangements are described above in detail. The arrangements are not limited to the specific embodiments described herein, but rather, components of the system may be utilized independently and separately from other components described herein. The seal described herein can also be used in combination with other turbine casing seal arrangement components.

While the invention has been described in terms of various specific embodiments, those skilled in the art will recognize that the invention can be practiced with modification within the spirit and scope of the claims.

What is claimed is:

1. A method of assembling a steam turbine, said method comprising:

positioning a sealing member in a leakage path defined between a first stage nozzle diaphragm and a packing casing, wherein the first stage nozzle diaphragm has a first coefficient of thermal expansion, and the packing casing has a second coefficient of thermal expansion; and coupling the first stage nozzle diaphragm and the packing casing such that the sealing member is fixedly secured between the first stage nozzle diaphragm and the packing casing.

2. A method in accordance with claim 1 wherein coupling the first stage nozzle diaphragm and the packing casing comprises mechanically coupling the first stage nozzle diaphragm and the packing casing.

3. A method in accordance with claim 2 wherein coupling the first stage nozzle diaphragm and the packing casing comprises mechanically coupling the first stage nozzle diaphragm and the packing casing using at least one of a bolt, a screw, a stud, and a rivet.

4. A method in accordance with claim 1 wherein positioning a sealing member comprises positioning a sealing member including a pair of substantially semi-circular portions between the first stage nozzle diaphragm and the packing casing.

5. A method in accordance with claim 1 wherein positioning a sealing member comprises positioning a sealing member having a third coefficient of thermal expansion between the first stage nozzle diaphragm and the packing casing, wherein the third coefficient of thermal expansion is different than the first coefficient of thermal expansion and the second coefficient of thermal expansion.

6. A method in accordance with claim 1 wherein positioning a sealing member comprises positioning a sealing member having a third coefficient of thermal expansion between the first stage nozzle diaphragm and the packing casing, wherein the third coefficient of thermal expansion is greater than the first coefficient of thermal expansion and the second coefficient of thermal expansion.

7. A method in accordance with claim 1 wherein positioning a sealing member comprises positioning a sealing member fabricated from an austenitic stainless steel between the first stage nozzle diaphragm and the packing casing.

8. A seal assembly for sealing a leakage path defined within a steam turbine engine, said seal assembly comprising:

a sealing member; and at least one coupling device extending through said sealing member such that said sealing member is fixedly secured between a first stage steam turbine nozzle diaphragm and a steam turbine packing casing.

9. A seal assembly in accordance with claim 8 wherein said coupling device is configured to mechanically couple the first stage steam turbine nozzle diaphragm and the steam turbine packing casing.

10. A seal assembly in accordance with claim 8 wherein said at least one coupling device comprises at least one of a bolt, a screw, a stud, and a rivet.

11. A seal assembly in accordance with claim 8 wherein said sealing member comprises a pair of substantially semi-circular members.

12. A seal assembly in accordance with claim 8 wherein said first stage steam turbine nozzle diaphragm has a first coefficient of thermal expansion, said steam turbine packing casing has a second coefficient of thermal expansion, and said sealing member has a third coefficient of thermal expansion that is greater than said first coefficient of thermal expansion and said second coefficient of thermal expansion.

13. A seal assembly in accordance with claim 8 wherein said first stage steam turbine nozzle diaphragm has a first coefficient of thermal expansion, said steam turbine packing casing has a second coefficient of thermal expansion, and said sealing member has a third coefficient of thermal expansion that is different than said first coefficient of thermal expansion and said second coefficient of thermal expansion.

14. A seal assembly in accordance with claim 8 wherein said sealing member comprises an austenitic stainless steel.

15. A seal assembly in accordance with claim 8 wherein said sealing member comprises a plurality of arcuate segments.

16. A rotary machine comprising:

a first stage steam turbine nozzle;

a steam turbine packing casing;

a sealing member; and a plurality of bolts extending through said sealing member such that said sealing member is fixedly secured between said first stage steam turbine nozzle diaphragm and said steam turbine packing casing.

17. A rotary machine in accordance with claim 16 further comprising an opposed flow High Pressure (HP)/Intermediate Pressure (IP) turbine rotor.

18. A rotary machine in accordance with claim 16 wherein said plurality of bolts are configured to mechanically couple said first stage steam turbine nozzle diaphragm to said steam turbine packing casing.

19. A rotary machine in accordance with claim 16 wherein said first stage steam turbine nozzle diaphragm has a first coefficient of thermal expansion, said steam turbine packing casing has a second coefficient of thermal expansion, and said sealing member has a third coefficient of thermal expansion that is greater than said first coefficient of thermal expansion and said second coefficient of thermal expansion.

20. A rotary machine in accordance with claim 16 wherein said sealing member comprises a plurality of segments.

* * * * *